United States Patent [19]

Krawchuk et al.

[11] Patent Number: 4,641,774

[45] Date of Patent: Feb. 10, 1987

[54] FIXTURE FOR EXPLOSIVELY WELDING A TUBE TO A TUBESHEET

[75] Inventors: Myron Krawchuk, Newton; Joseph C. Spoganetz, Carteret, both of N.J.

[73] Assignee: Foster Wheeler Energy Corporation, Livingston, N.J.

[21] Appl. No.: 751,646

[22] Filed: Jul. 3, 1985

[51] Int. Cl.⁴ ............................................. B23K 20/08
[52] U.S. Cl. .................................... 228/2.5; 29/421 E
[58] Field of Search ............. 228/2.5; 29/157.4, 421 E

[56] References Cited

U.S. PATENT DOCUMENTS

| | | | |
|---|---|---|---|
| 3,402,870 | 9/1968 | Carlson et al. | 228/2.5 |
| 3,411,687 | 11/1968 | Riley et al. | 228/2.5 |
| 3,555,656 | 1/1971 | Brown et al. | 228/2.5 |
| 3,661,004 | 5/1972 | Lee et al. | 228/2.5 |
| 3,993,001 | 11/1976 | Hawes | 228/2.5 |
| 4,117,966 | 10/1978 | Green et al. | 228/2.5 |
| 4,205,422 | 6/1980 | Hardwick | 228/2.5 |
| 4,513,903 | 4/1985 | Feldstein et al. | 228/2.5 |
| 4,527,623 | 7/1985 | Baird et al. | 228/2.5 |

FOREIGN PATENT DOCUMENTS 134092 10/1981 Japan ................................. 228/2.5

Primary Examiner—Nicholas P. Godici
Assistant Examiner—Samuel M. Heinrich
Attorney, Agent, or Firm—Marvin A. Naugur; John E. Wilson; Warren B. Kice

[57] ABSTRACT

A fixture for explosively welding a tube to a tubesheet in which a plug extends within a cup which in turn is inserted into a fixture tube. A first explosive extends within the chamber defined by the cup and the plug and a second explosive extends within a bore defined within the plug. The sensitivity of the second explosive is greater than that of the first explosive so that, upon detonation by an externally actuated elongated detonation member, sequential detonation of the second explosive and the first explosive occurs.

3 Claims, 2 Drawing Figures

FIXTURE FOR EXPLOSIVELY WELDING A TUBE TO A TUBESHEET

BACKGROUND OF THE INVENTION

This invention relates to a fixture for explosively welding a tube into a tubesheet and, more particularly, to such a fixture for providing sequential detonation of a plurality of explosives.

In order to secure a plurality of heat exchange tubes in corresponding bores formed in a tubesheet, several techniques have evolved. One of the most effective techniques is to explosively force each tube against the internal wall defining the corresponding bore in the tubesheet, which involves detonating an explosive placed within the tube so that the resulting explosive forces acting on the tube expands it and forces the outer surface of the tube to the bore wall causing a weld.

In conventional welding methods of this nature, several problems exist. For example, the materials used to fabricate the tubes and/or the tubesheets are often incompatible with these types of techniques. Therefore in order to permit the welding, materials have to be used which, although weldable, are more susceptible to high temperature corrosion.

Also, according to some of these techniques, only one tube can be formed at a time, which is unacceptable in hazardous locations where operator residence time is limited.

Further, due to the large number of different tube sizes, tubesheet designs and material combinations, a corresponding variance in the sizes of the explosive insert, are required which makes the cost of fabricating injection dies and tooling for the inserts impractical from a cost standpoint.

SUMMARY OF THE INVENTION

It is therefore an object of the present invention to provide a fixture for explosively welding a tube to a tubesheet which permits the welding of materials that are normally not weldable by conventional methods.

It is a further object of the present invention to provide a fixture of the above type in which several tubes can be welded simultaneously.

It is a further object of the present invention to provide a fixture of the above type which can be made from a low cost, easily machinable, plastic material by simple fabrication techniques which lends itself to low-to-medium quantity production at reasonable expense.

Toward the fulfillment of these and other objects the fixture of the present invention includes a cup for inserting into the tube to be welded. A plug extends within the cup to define therewith a chamber for containing a first explosive. A second explosive extends within a bore formed in the plug and has a sensitivity greater than that of said first explosive. An elongated detonation member extends within the bore and externally of the tube for detonating the second explosive which, in turn, detonates the first explosive.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
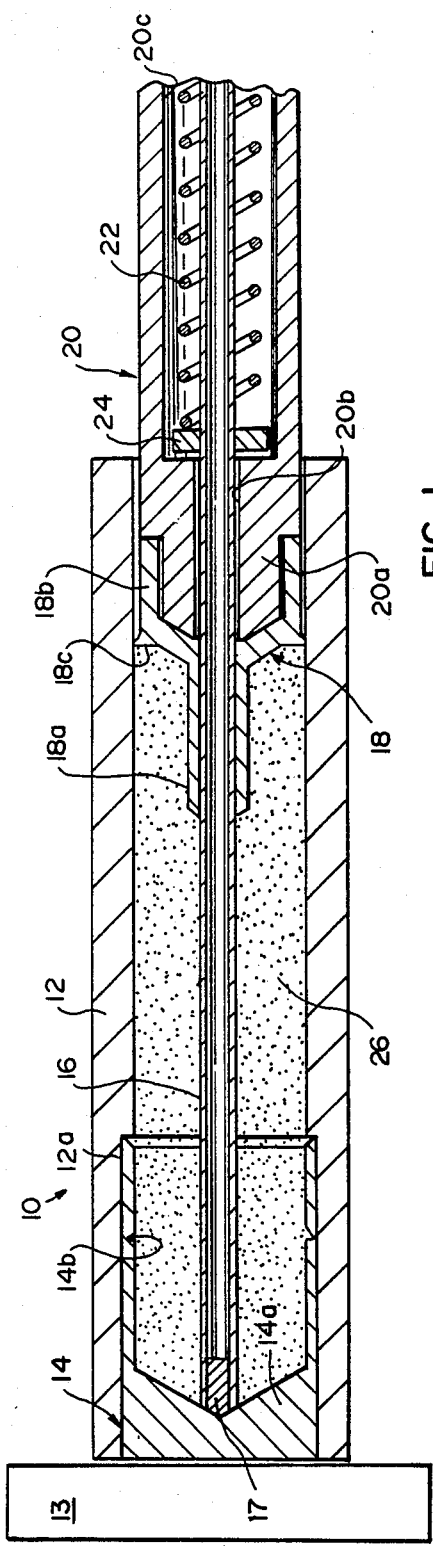
FIG. 1 is a cross-sectional view of two components of the fixture of the present invention prior to their final assembly.

Referring to FIG. 1 of the drawings the reference numeral 10 refers, in general, to a fixture assembly consisting of a fixed tube 12 abutting against a stop member 13 which is positioned with an air cylinder and having a counterbore 12a formed at one end thereof. A cup member 14 extends within the counterbore 12a and has a base portion 14a abutting the stop member 13 and an annular groove 14b formed in its inner wall surface, for reasons that will be explained in detail.

An elongated hollow rod 16 has one end provided with a felt plug 17 which abuts against the center of the base portion 14a of the cup member 14. The rod 16 extends for the entire length of the tube 12 and the other end portion of the rod projects outwardly from the corresponding end of the tube.

A plug 18 is disposed within the tube 12 in a spaced relation to the cup member 14 and includes a tubular portion 18a and a base portion 18b. A land, or flange, 18c is formed on the outer surface of the base portion 18b which fits into the groove 14b of the cup 14, as will be described.

A piston 20 has a head portion 20a formed at one end and shaped similarly to the interior of the base portion 18b for fitting within said interior portion. The piston 20 has a bore 20b extending for its length for receiving the rod 16. A portion of the bore 20b is enlarged at 20c to accommodate a spring 22 which extends over the rod 16 and which abuts against a center rod collar 24 affixed to the rod. Although the other end of the piston 20 is not shown, it is understood that it is operatively connected to an air cylinder (not shown) in a conventional manner for driving the piston, and therefore the plug 18, in a direction from right-to-left as viewed in FIG. 1.

The space within the tube 12 between the base 14a of the cup member 14 and the plug 18 contains a granular explosive 26, such as nitroquanidine, or the like.

Further, the components of the present invention can be fabricated of a thermoplastic material such as polyethylene, or any other similar type low cost, easily machinable plastic material which lends itself to relatively inexpensive, low-to-medium quantity production.

When assembling the fixture assembly 10, the plug 18 is inserted in the tube 12 in the position shown in FIG. 1, and the rod 16 is inserted through the interior of the plug. The assembly is then positioned vertically with the piston 20 at the bottom and a pre-weighed charge of the explosive 26 is placed in the tube 12. The cup member 14 is then placed in the counterbore 12a with the explosive thus extending in a chamber defined by the tube, the cup member and the plug 18. The stop member 13 is then placed in abutment with the tube 12 and the cup member 14, and the piston 20 is advanced, by its air cylinder, to the position shown in FIG. 1 with its head portion 20a extending in the interior of the plug 18.

Figure 2:
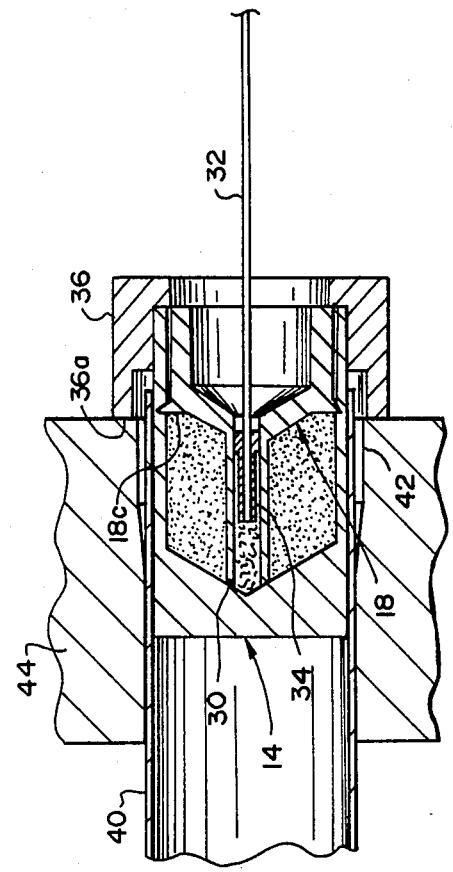
FIG. 2 is a cross-sectional view of the fixture of the present invention in a fully assembled condition and inserted within a tube to be welded to a tubesheet.

The air cylinder is then further actuated to drive the plug further in a direction from right-to-left as viewed in the drawings until the plug 18 is driven into the interior of the cup member 14 and the flange 18c extends into the groove 14b of the cup member, as shown in FIG. 2. During this latter movement the spring 22 acts against the collar 24 and holds the rod 16 in place, while the explosive 26 is compressed into the space defined between the interior of the cup member 14 and the corresponding exterior surfaces of the plug 18. It is noted that, during the above movement of the plug 18 into the interior of the cup member 14 the felt plug functions to prevent the passage of the explosive into the interior of the rod 16 but permits the passage of air to vent same. The piston 20 is then retracted, the rod 16 removed from the interior of the plug 18, and the plug 18 with the cup member 14 contained therein, is removed from the counterbore 12a.

A measured quantity of a second explosive material 30, such as plasticized PETN (pentaerythritoltetranitrate) is then inserted in the end of the tubular portion 18a of the plug 18, as shown in FIG. 2, and a detonating-cord 32, surrounded by a tubular retainer member 34, is inserted into the tubular portion 18a until they abut the second explosive material 30. The detonating-cord 32 extends outwardly from the assembly and is adapted to be connected to an externally located detonator (not shown), in a conventional manner.

A cap 36 is placed over the end of the cup member 14 and the assembly thus formed is inserted within a tube 40 which is to be welded against the internal wall forming a bore 42 of a tubesheet 44. The assembly thus formed is accurately positioned relative to the tubesheet 44 by virtue of the end 36a of the cap abutting the corresponding surface of the tubesheet 44.

The sensitivity of the explosive material 30 is greater than that of the explosive 26 so that the detonating-cord 32, when detonated by the externally located detonator, functions to detonate the explosive 30 which, in turn, detonates the explosive 26. This sequential detonation eliminates the need for providing a detonating-cord with a relatively large charge and thus minimizes damage to the various components of the assembly 10.

Several advantages result from the foregoing. For example the assembly of the present invention permits welding of materials that are normally not weldable by conventional methods. Also, several tubes can be welded simultaneously. Further, the fixture of the present invention can be made from a low cost, easily machinable, plastic material by simple fabrication techniques which lends itself to low-to-medium quantity production at reasonable expense.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A fixture for explosively welding a tube to a tubesheet comprising a cup for inserting into said tube, said cup having an open end and a hollow interior, a plug extending within said cup to define therewith a chamber, said plug including a tubular portion extending in said chamber and having an internal bore, a first explosive extending within said chamber, a second explosive extending within said bore and separated from said first explosive by said tubular portion, said second explosive having a sensitivity greater than of said first explosive, an elongated detonation member extending within said bore and externally of said fixture for detonating said second explosive which in turn detonates said first explosive and a tubular insert extending in said bore for receiving and positioning said detonation member in said bore in intimate contact with said second explosive.

2. The fixture of claim 1 further comprising cap means extending over said plug and said cup and in abutment with said tubesheet for locating said cup relative to said tubesheet.

3. The fixture of claim 1 further comprising a locking flange extending from the outer surface of said plug for engaging a corresponding groove formed in said cup for locking said plug in said cup.

* * * * *